United States Patent

[11] 3,625,271

| [72] | Inventor | Harry Lewis Hutch |
| | | 3810 Englewood Drive, Stow, Ohio |
| [21] | Appl. No. | 54,276 |
| [22] | Filed | July 13, 1970 |
| [45] | Patented | Dec. 7, 1971 |

[54] RADIAL TIRE WITH STRENGTHENED BEAD TIE-IN
6 Claims, 2 Drawing Figs.

[52] U.S. Cl. .................................................... 152/354, 152/356
[51] Int. Cl. ..................................................... B60c 9/08
[50] Field of Search .......................................... 152/354, 356, 362

[56] References Cited
FOREIGN PATENTS
579,877  6/1933  Germany ..................... 152/356
1,480,944  2/1969  Germany ..................... 152/356

Primary Examiner—Arthur L. La Point
Assistant Examiner—Robert Salfer
Attorneys—Frank C. Rote, Jr. and Harry F. Pepper, Jr.

ABSTRACT: The annular margins of a radial ply carcass are plaited or folded back and turned around the bead cores such that the bead portion and, if preferred, the lower or inner portions of the sidewalls of the tire are reinforced by four layers of ply cords while the remainder of the tire carcass reinforcement is in the form of a single layer of cords. Thus, in one tire, advantages of a single radial ply carcass reinforcement are combined with advantages of a two-ply "tie-in" at the beads. The plaited margins can be either turned "up" or turned "down" around the bead cores thereby locating each folded terminal edge of the carcass either outside or inside the bead cores.

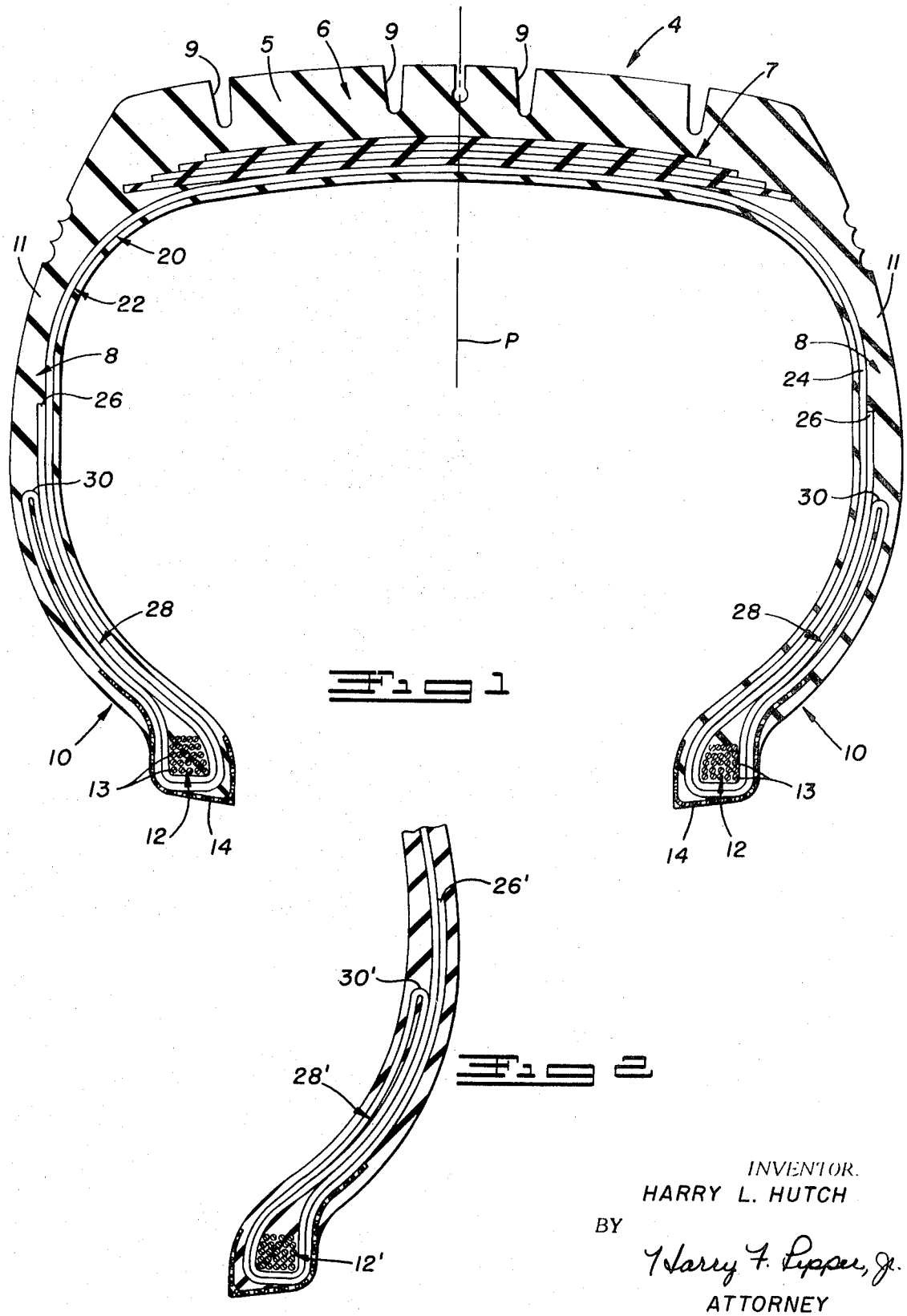

RADIAL TIRE WITH STRENGTHENED BEAD TIE-IN

BACKGROUND OF THE INVENTION

The invention relates to pneumatic tires and particularly to structural details of radial-type pneumatic tires.

A radial-type pneumatic tire is one in which the carcass or body includes cords all of which are oriented substantially radially of the rotational axis of the tire, or more accurately, cords lying in planes which cross the plane containing the circumferential centerline of the tire at substantially a 90° angle. Classical radial tire construction includes additional reinforcement in the form of a circumferentially disposed belt assembly in the tread area of the tire, which is normally positioned radially outside the carcass or body reinforcement. The carcass reinforcement can be a single layer or a plurality of layers of mutually parallel, radially oriented cords embedded in an elastomeric material, sometimes called "skim compound." A layer or ply of these rubber-coated cords can extend continuously across the tire from bead to bead, and is normally anchored or "tied in" to the bead area by having the ends thereof turned around the circular, substantially rigid, axially spaced bead cores incorporated within the bead portions of the tire.

Depending upon which side of the bead cores or assemblies the ends of the ply are located, the tie-in to the beads described is usually called either a "turnup" or "turndown." If the ends of the ply are axially outside the bead assemblies, the carcass-bead portion tie-in is called a turnup. If on the other hand, the ends of the plies are axially inside the bead assemblies, the tie-in is called a turndown. Thus, by the conventional tie-in techniques described, each single-carcass ply or layer of cords affords two layers of cord reinforcement in each bead area or portion of the tire. This turnup or turndown reinforcement area can include lower portions of the sidewalls of the tire depending on how "high" or far, radially beyond the bead assemblies, the ends of the ply extend.

It is commonly known that the sidewall portions of a radial ply tire flex to a much greater degree than do sidewalls of bias ply tires. This is primarily due to the aforementioned 90° disposition of the carcass cords in a radial ply tire as compared to the "bias" or acute angle disposition of the carcass cords of a bias ply tire. Because of this greater sidewall flexibility, the stiffness in the bead portions and/or lower sidewall portions of a radial ply tire become somewhat important with regard to the overall strength and support characteristics of the tire.

Radial ply tires are increasing in popularity due to several factors, including better handling and wear. It has also been found that a monoply radial tire or radial tire which has essentially a carcass reinforced by just a single layer or ply of radially disposed cords offers further advantages, when compared to radial tires with a plurality of superposed layers of carcass-reinforcing cords. These advantages include softer ride and still better handling characteristics. However, when utilizing the aforementioned conventional bead tie-in techniques in a single-ply or layer-type radial tire, only the two layers of cord reinforcement in each bead portion resulting from the tie-in, does not produce the required rigidity or stiffness in the bead portions. A two-ply or two-layer radial-type carcass tied in by conventional procedures to the beads does afford sufficient stiffness or rigidity, because of resulting four layers of reinforcement in the bead area.

In order to stiffen or strengthen the bead portions and, if desired, the lower portions of the sidewall of a single-ply radial tire, certain tire manufacturers have resorted to steel chafer strips positioned along the inside surface of the bead portions between the rim flange and the bead portions. However, it has been found that when such tires are operated in an underinflated condition, tire failure can occur in the bead portions due primarily to the presence of these metal strips. Also, movement of such wire chafers relative to the rim flanges, can cause severing and/or loosening of the wire cables, which can ultimately lead to tire failure. In addition, wire chafers frequently are more expensive to use in pneumatic tires both from a material and processing standpoint.

SUMMARY OF THE INVENTION

It is an object of the present invention to provide a radial ply tire with a more strengthened reinforcement in the bead portion of the tire.

It is another object of the present invention to provide a radial ply tire which is basically a single-ply carcass radial-type tire, but which includes a two-ply carcass type tie-in in the bead portions or radially inner portions of the tire.

It is still a further object of the present invention to provide a single-ply carcass radial-type tire having suitable stiffness in the bead portions of the tire, without the necessity of employing additional reinforcing components of an unusual nature such as chafer strips of steel or other special material.

These and other objects, which will become evident in the detailed description which follows, are achieved by providing that the carcass ply structure of the radial-type tire which extends from bead portion to bead portion be made slightly wider than usual, with the marginal excess being folded back to form plaited, annular margins. These plaited margins are turned up or down around the beads. Thus, for each single-ply or layer or carcass-reinforcing cords or ply structure of the single-layer type, there is a double-ply carcass type tie-in at the beads. In other words, for each carcass tire structure which is basically or essentially a layer of radially oriented cords, there is a multilayer cord reinforcement in the bead area, preferably two layers on each side of each bead core or assembly.

BRIEF DESCRIPTION OF THE DRAWINGS

FIG. 1 shows a tire cross section, the details of which demonstrate the invention according to a preferred embodiment.

FIG. 2 is a partial section of a part of the lower portion of a tire cross section similar to that shown in FIG. 1 showing a modification of the invention demonstrated by FIG. 1.

PREFERRED EMBODIMENTS OF THE INVENTION

FIG. 1 shows a tire, generally indicated 4, which comprises an annular tread portion, generally indicated 6, axially spaced and radially disposed, annular sidewall portions, generally indicated 8, extending from the tread portion 6 to a pair of axially spaced annular bead portions, generally indicated 10. The tire 4 is reinforced by a body or carcass ply structure, generally indicated 20.

The tread portion 6 includes a circumferentially disposed belt assembly 7 which may include one or, as indicated, a plurality of superposed belt plies. The construction of this belt assembly forms no significant part of the instant invention and thus, will not be described in further detail. The outer surface or periphery of tread portion 6 includes a typical tread design, including circumferentially extending grooves 9, the additional details of which are not necessary to the understanding of the instant invention. The tread portion includes a suitable elastomeric vulcanizate or "stock" 5, usually selected for its good wearing properties.

The sidewall portions usually comprise an elastomeric stock 11 of composition distinct from that of tread stock 5, and is usually selected in the case of a radial-type tire, for its ability to withstand high flexing.

Each bead portion 10, which is simply the lower extension of each sidewall portion 8, includes a substantially circular bean core or assembly 12, which is highly rigid and inextensible in order that the tire 4 may be properly secured on a rim (not shown). For example, bead assemblies 12 as shown in FIG. 1 can each comprise a bundle of metal cables or wires 13. The radially inner ends of the bead portions 12 typically include a chafer strip 14 in order to protect or insulate the tire from cutting or abrasion by the rim flange. Chafer strips such as 14 are usually textile filament reinforced rubber strips.

The tire 4, i.e. the tread portion 6, sidewall and bead portions 8 and 10, respectively, are reinforced by a carcass ply structure 20. The carcass ply structure 20 is shown as a single-ply 22 comprising cords 24 extending continuously from bead portion to bead portion radially along the sidewalls 8 and across the tread portion 6. The cords 24 of carcass ply 22 are disposed 90° relative to the plane P which contains the circumferential centerline of the tire 4. The ends 26 of the carcass ply 22, are shown folded or doubled back so as to form a pair of plaited, annular margins, generally indicated 28. The plaited margins 28 are further folded or turned up around the bead cores 12. Folding the ply ends 26 back to form the plaited margins 28 as shown, results in a folded edge 30, definitive of the functional width of the carcass ply 22 as it is used to reinforce the tire 4. The tie-in of the carcass ply 22 to the beads 12 is such that the plaited margins 28 are turned up around the bead cores 12. In other words, each folded edge 30 is axially outside each bead core 12 and each actual end 26 of ply 22 is axially inside the cores 12. Each folded edge 30 and ply end 26 extends upwardly or outwardly relative to the bead assemblies 12 into a lower or axially inner part of the sidewall portions 8 as is common practice. The height of the turnup (i.e. the distance folded edge 30 is disposed above bead core 12) is a factor to be determined when deciding the area of rigidity or stiffness desired in the lower sidewall and bead portions 10 of the tire 4. Also, the location of the ply ends 26 relative to the folded edges 30 can be a factor affecting the sidewall or bead portion stiffness. As specifically shown in FIG. 1, the ply ends 26 are radially above or beyond the folded edges 30, allowing for a reinforcement "stepoff" in the sidewall portion 8. In other words, axially outwardly from bead cores 12, the tire is reinforced by four layers of cord up to the location of folded edge 30, followed by a two-layer reinforcement upwardly or outwardly therefrom to the location of ply end 26 and finally to a single-layer reinforcement beyond the locations of ply ends 26. The dispositions of each folded edge 30 and each ply end 26 as shown in FIG. 1 is understood to be exemplary only, and many variations in these locations are possible within the scope of the present invention. Also, the relation between the location of the ends 26 relative to the folded edges 30 may be varied from what is shown in FIG. 1. For example, ends 26 may be located radially inwardly or below relative to folded edges 30, if so desired. In fact, if desired, each end 26 may be immediately adjacent the axially inner edge of each bead core 12, producing in effect only a three-ply or layer reinforcement in the bead area. This latter construction may on occasion be more suitable in smaller size tires, where extending end 26 further outwardly or upwardly might produce more bead area stiffness than desired.

While the carcass ply structure is shown to be a single "continuous-type" carcass ply 22 in FIG. 1, it is understood that the carcass ply structure 20 may be, as a practical matter, "-continuous" but in actuality a discontinuous ply. In other words, carcass ply structure 20 may have one or a plurality of breaks in the continuity of its extension from bead portion to bead portion. Thus, carcass ply structure 20 may essentially comprise a single layer of cords 24, but be a discontinuous structure somewhere along its extent from bead portion to bead portion. For example, carcass ply structure may be discontinued somewhere in the area of the tread portion 6 if desired. Thus, a single "carcass ply structure" when referred to in the instant application is meant to include reinforcement such as a continuous ply 22, or discontinuous ply-type reinforcement which comprises a layer of mutually parallel radially oriented reinforcing cords.

The cords 24 may be any of the textile or metallic materials normally used as tire reinforcement. For example, the cords 24 may be cotton, nylon, polyester, glass, rayon or steel. For purposes of this description the term "textile" material is meant to include the typical textile-type tire-reinforcing materials such as cotton, rayon, nylon and polyester, as well as glass. Also, the term "cords" is meant to include cordlike metallic elements which are sometimes alternatively referred to as "cables."

The ply structure 20 is normally folded to form the plaited annular margins 28 before applying the structure to a tire-building drum during a typical tire-building operation. The actual width of the fold or plait forming margins 28, the ultimate dispositions of each folded edge 30 and ply end 26 are all parameters which can be decided upon, prior to building of the tire, when taking into account the desired final tire construction.

Thus, the tire shown in FIG. 1 is functionally or, in effect, a monoply carcass radial-type tire with a four-ply or four-cord layer reinforcement in the bead area and/or lower sidewall area. Therefore, a tire such as 4, will demonstrate both the stiffness characteristics of a two-ply radial tire in the bead areas and the desirable advantages of a single-ply carcass throughout the remainder of the tire body.

The modification shown in FIG. 2 shows the principles of the invention wherein the annular plaited margins 28' are turned "down." As seen in FIG. 2 the folded edge 30' is inside the bead core 12' while the ply end 26' is axially outside the bead core 12'. Again, and as stated above, the particular locations of each of the ply ends 26' and folded edge 30' may be varied as desired.

While principles of the invention are specifically described as limited to a single-ply or single-layer carcass, it is understood that other advantages are made possible utilizing these same principles. For example, a double-layer carcass or two-ply structure may be made so as to include folded or plaited margins resulting in a two-ply radial-type carcass having a bead area stiffness commensurate with that of a four-ply tire with conventional turnups. In other words, a two-ply carcass in which each margin is folded would provide eight layers of cords turned around each of the beads.

In a multiple layer or multiple ply carcass structure it is also possible that only selected plies or layers of the multiply layer structure be folded in order to give selected variations in stiffness. For example, in the two-ply-type carcass mentioned above, only one ply may be folded and turned around the beads while the other may be turned around in a typical manner (i.e. with no folded margins). This would result in a radial ply tire with a two-ply carcass and a six-ply turnup.

The invention is particularly adaptable to radial ply tires because folding or causing the margins thereof to be plaited does not drastically change the general direction of cord orientation. In other words, in a bias ply tire a plaited margin could cause an overall unbalance, because the folding would result in adjacent layers of cords in the turnup to lie in opposite directions. Also, since a bias ply tire is not as flexible in the sidewall than is a radial ply tire, the stiffness requirement is not quite as exacting in the lower sidewall or bead portion of the tire. Finally, it is rather uncommon to design a single-layer carcass bias-type tire. Conventional bias tires are usually limited to at least two carcass plies.

While the foregoing description relates to a preferred embodiment of the invention, it is understood several obvious departures from these specific are possible. Some of these have been discussed, while others should be clear from what has been described. Such obvious departures are considered within the scope of the invention which is to be measured by the scope of the appended claims.

What is claimed is:

1. A pneumatic tire having an annular tread portion including a circumferentially disposed belt assembly, a pair of axially spaced bead portions disposed radially inwardly relative to said tread portion, each bend portion including a substantially circular, substantially rigid bead assembly, a pair of axially spaced sidewall portions extending from said bead portions to said tread portion and at least one carcass ply structure having radially disposed reinforcing cords extending from bead portion to bead portion radially along said sidewall portions and axially across said tread portion, said carcass ply structure including plaited, annular margins turned around said bead assemblies so as to form two layers of cord reinforcement disposed both axially inwardly and outwardly of said bead assembly in each of said bead portions.

2. The pneumatic tire as defined in claim 1 wherein said plaited, annular margins are turned up around said bead assemblies thereby locating the folded terminal edges of said at least one carcass ply axially outside said bead assemblies.

3. The pneumatic tire as defined in claim 1 wherein said plaited, annular margins are turned down around said bead assemblies thereby locating the folded, terminal edges of said at least one carcass ply axially inside said bead assemblies.

4. The pneumatic tire as defined in claim 1 wherein said at least one carcass ply structure having radially disposed reinforcing cords comprises a single ply extending continuously from bead portion to bead portion radially along said sidewall portions and axially across said tread portion.

5. The pneumatic tire as defined in claim 4 wherein said plaited, annular margins are turned up around said bead assemblies thereby locating the folded terminal edges of said at least one carcass ply axially outside said bend assemblies.

6. The pneumatic tire as defined in claim 4 wherein said plaited, annular margins are turned down around said bead assemblies thereby locating the folded terminal edges of said at least one carcass ply axially inside said bead assemblies.

* * * * *

PO-1050
(5/69)

UNITED STATES PATENT OFFICE
CERTIFICATE OF CORRECTION

Patent No. 3,625,271  Dated December 7, 1971

Inventor(s) Harry Lewis Hutch

It is certified that error appears in the above-identified patent and that said Letters Patent are hereby corrected as shown below:

In the heading between lines 5 and 6, the following should be inserted -- Assignors to The General Tire & Rubber Company, Akron, Ohio.

Column 2, line 65, "bean" should be -- bead --.

Column 4, line 33, "multiply" should be -- multiple --.

Signed and sealed this 5th day of December 1972.

(SEAL)
Attest:

EDWARD M. FLETCHER, JR.
Attesting Officer

ROBERT GOTTSCHALK
Commissioner of Patents